US012166660B2

(12) United States Patent
Rangarajan et al.

(10) Patent No.: US 12,166,660 B2
(45) Date of Patent: Dec. 10, 2024

(54) DETECTING IN-TRANSIT INBAND TELEMETRY PACKET DROPS

(71) Applicant: Arista Networks, Inc., Santa Clara, CA (US)

(72) Inventors: Vijay Rangarajan, Fremont, CA (US); Padmanabh Ratnakar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 65 days.

(21) Appl. No.: 18/058,138

(22) Filed: Nov. 22, 2022

(65) Prior Publication Data

US 2024/0171498 A1 May 23, 2024

(51) Int. Cl.
*H04L 45/12* (2022.01)
*H04L 45/24* (2022.01)
*H04L 47/41* (2022.01)

(52) U.S. Cl.
CPC .......... *H04L 45/123* (2013.01); *H04L 45/245* (2013.01); *H04L 47/41* (2013.01)

(58) Field of Classification Search
None
See application file for complete search history.

(56) References Cited

U.S. PATENT DOCUMENTS

| 2020/0067792 | A1* | 2/2020 | Aktas | H04L 41/5009 |
| 2020/0280518 | A1* | 9/2020 | Lee | H04L 47/115 |
| 2021/0084530 | A1* | 3/2021 | Song | H04W 28/0289 |
| 2023/0010406 | A1* | 1/2023 | Doshi | H04L 63/0218 |
| 2023/0098201 | A1* | 3/2023 | Bahnasy | H04L 47/11 370/235 |

* cited by examiner

*Primary Examiner* — Mohamed Ibrahim
(74) *Attorney, Agent, or Firm* — Fountainhead Law Group, PC

(57) ABSTRACT

Systems, methods, and computer-readable media are disclosed for characterizing data flows within an in-band telemetry (INT) domain. First aggregated statistical data regarding a flow of INT packets is periodically received from a first aggregating network device. The flow of INT packets flows from an initiator network device via one or more transit network devices to a terminator network device. Second aggregated statistical data regarding the flow of INT packets is periodically received from a second aggregating network device. In response to comparing the first aggregated statistical data and the second aggregated statistical data, one or more dropped INT packets may be implicitly identified. Based on the one or more dropped INT packets in the flow of INT packets, a dropped INT packet notification may be provided.

20 Claims, 6 Drawing Sheets

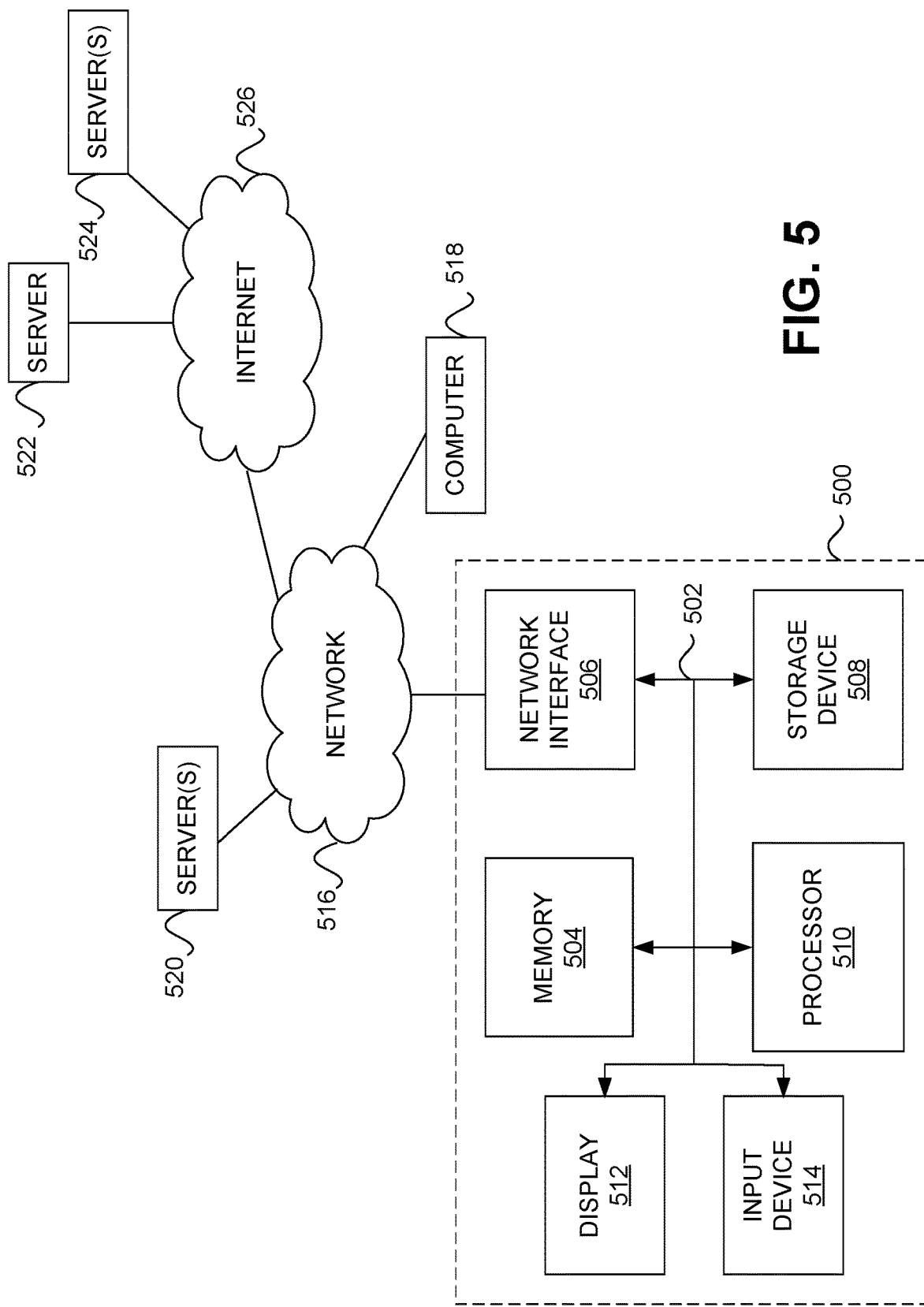

DETECTING IN-TRANSIT INBAND TELEMETRY PACKET DROPS

BACKGROUND

A multitude of network devices, such as routers and network switches, can be deployed to implement large and/or complex data networks. In a conventional INT domain, data planes of network devices in the INT domain may periodically clone packets in a packet flow and on a per-hop basis append metadata, regarding the nature of the flow, to the cloned INT packets. In some other instances, instead of cloning the INT packets the metadata is appended to an original INT packet (to form a modified INT packet) and stripped before the INT packets exit the INT domain. Once a cloned (or modified) INT packet has traversed a path within the INT domain, from an initiator device through one or more transit devices, finally terminating at a terminator device, the terminator device will have a set of received INT packets with complete sets of telemetry metadata regarding paths traversed and per-hop latencies, etc.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates an exemplary host hardware platform according to one or more embodiments.

DETAILED DESCRIPTION

Overview

Figure 1:
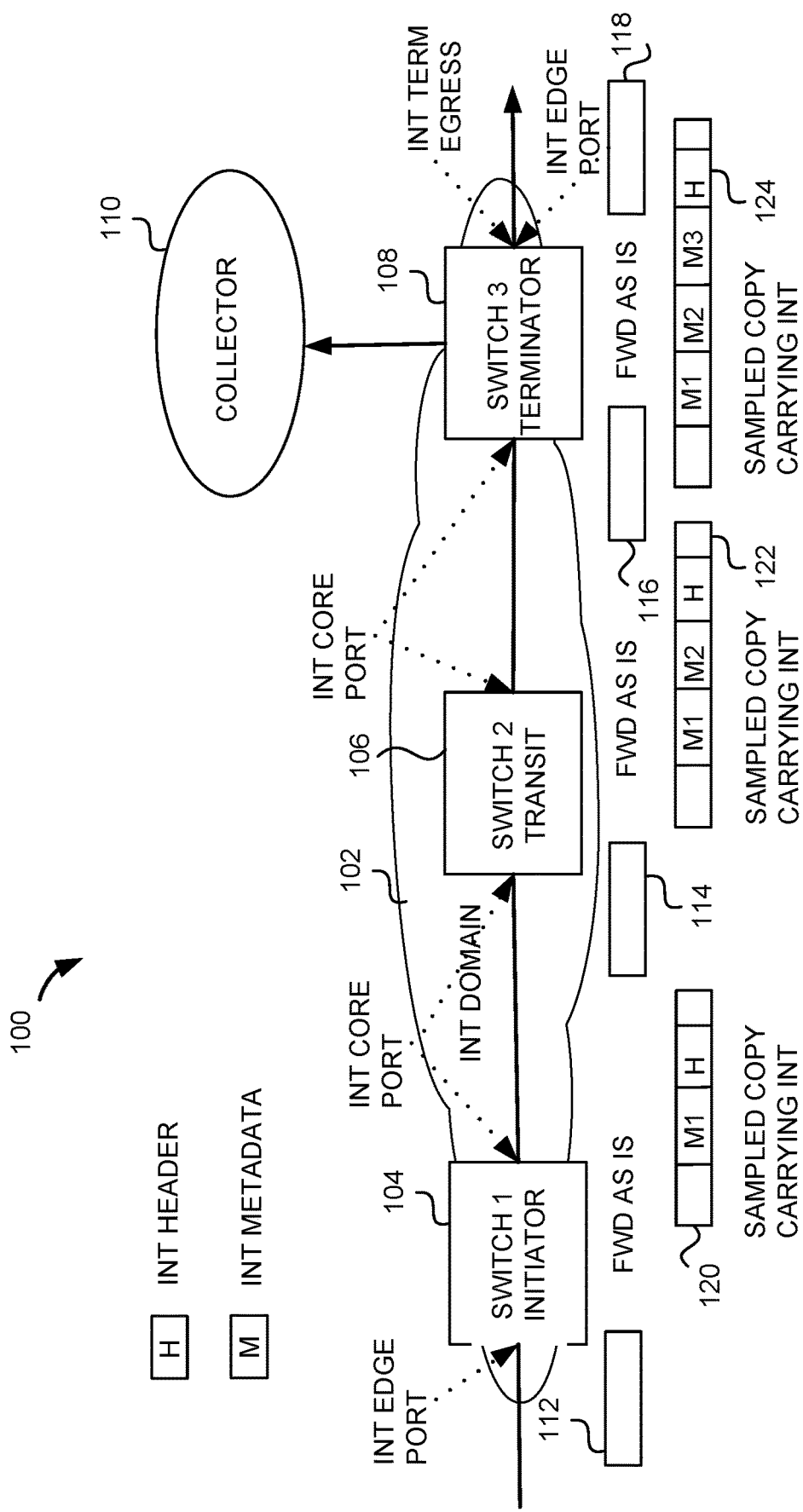
FIG. 1 illustrates an environment in which mechanisms operate for characterizing one or more data flows within an in-band telemetry (INT) domain according to one or more embodiments.

The present teachings describe using in-band telemetry (INT) data that is aggregated along with explicit INT dropped packet reports to provide network management information regarding health of a demarcated INT domain. In a conventional INT domain, data planes of network devices in the INT domain may periodically clone packets in a packet flow and, on a per-hop basis, append metadata, regarding a nature of the packet flow, to the cloned INT packets. In some other instances, instead of cloning the INT packets the metadata is appended to an original INT packet (to form a modified INT packet) and stripped before the INT packets exit the INT domain. Once a cloned (or modified) INT packet has traversed a path within the INT domain, from an initiator device through one or more transit devices, finally terminating at a terminator device, the terminator device will have a set of received INT packets with complete sets of telemetry metadata regarding paths traversed and per-hop latencies, etc. In some embodiments, such INT data may be aggregated and/or summarized into flow tables, which may then be sent to a network management collector for further analysis.

Network management technology in accordance with the present teachings expands this paradigm in two important ways. First, in addition to aggregating INT statistical metadata, e.g., by calculating average latency, etc., at the terminator, the present teachings enable both initiator and transit network devices to calculate aggregated summary information in flow tables stored within the control plane of the intermediate network devices. Such intermediate network devices may then send these flow tables to a network management collector to provide intermediate INT information regarding a packet flow, without having to wait for the packets to reach an INT terminator device.

Second, the network management collector can analyze the received flow tables to identify missing packets. One use case relates to when an entire flow is dropped over a connection from one intermediate network device to another. In this use case, one or more flow tables associated with a downstream network device would have no information regarding a dropped flow, because it did not arrive. A second example is where some packets are lost, and therefore corresponding downstream statistics are not present in the flow tables sent by a downstream network device. By analyzing information about the missing packets, a network management collector can gain implicit information regarding dropped INT packets. By analyzing the upstream flow tables, information about the implicitly detected dropping of an INT packet, the network management collector can determine information about the dropped packet. However, in such an implicit scenario, a reason associated with the dropped INT packet may not be ascertainable.

An example corresponding to an implicitly detected dropped INT packet would be where there was a corrupted signal on an input port of a downstream network device. Hardware associated with a receiving downstream network device may indicate that there was a dropped packet on an input port, but for example due to an input signal being corrupted, hardware of the receiving device would not receive detailed information regarding the dropped packet. On the other hand, where a network device drops a packet for some reason associated with an outbound port, the network device may have specific information regarding why the packet was dropped, e.g., congestion or queue overflow, etc. In this case, the network device may be able to send a specific INT packet drop report to a network management collector, explicitly specifying why the INT packet was dropped. This scenario is referred to as the explicit scenario for dropped INT packets.

Mechanisms consistent with the present teachings provide benefits beyond INT statistics, such as flow and telemetry information, regarding dropped packets, generally, namely by providing specific information regarding dropped INT packets. Specifically aggregated information regarding the INT packets has advantages associated with not overloading processors associated with network devices or network management collectors. Additionally, detailed metadata associated with INT packets provides a richer set of network management information regarding health of the demarcated INT domain. Accordingly, the present disclosure has the advantage of providing a rich set of in-band telemetry data regarding data flows in an INT domain, even when INT packets are dropped.

Network Architecture

FIG. 1 illustrates an environment 100 in which mechanisms operate for characterizing one or more data flows within an in-band telemetry (INT) domain 102 according to one or more embodiments. Within INT domain 102, network packet flows enter at an INT edge port associated with switch 104, which is depicted in FIG. 1 as switch 1, which is an initiator. Packet flows advance from switch 104 to switch 106 which is depicted in FIG. 1 as switch 2, which is a transit switch within INT domain 102. Packet flows then advance potentially through multiple transit network devices within INT domain 102. Finally, packet flows advance to switch 108, which is depicted as switch 3, which is an INT terminator, meaning that switch 108 functions as an INT egress terminator, forwarding packet flows to one or more target devices (not shown) in FIG. 1.

In advancing along a path within INT domain 102, packet flows are forwarded from switch to switch from an ingress at an INT edge port (associated with switch 104 in FIG. 1) through INT core ports eventually to an INT terminal edge port (associated with switch 108 in FIG. 1) at a terminus of INT domain 102. As the packet flows are forwarded, a majority of the packets are simply forwarded as is. For example, packet 112 is received at switch 104 and forwarded as is from switch 104 to switch 106 as packet 114. Next as packet 116, the packet is forwarded as is to switch 108 and finally exits INT domain 102 as packet 118. These flows of ordinary packets are forwarded unmodified. However, in connection with INT, a certain number of sampled packets are copied and INT information added to the sampled packets before the sampled packets are forwarded. For example, packet 120 is sampled from a packet flow, copied and modified to carry INT information. Such INT information may include an INT header and various pieces of INT metadata. Packet 120 is shown having an INT header "H" and an INT metadata component designated "M1." Packet 122 is identified by one or more transit devices, such as switch 106 and additional INT metadata added to previously sampled and copied INT packet. As shown in FIG. 1, a metadata component designated "M2" is included in packet 122 as it is forwarded on to switch 108. Finally switch 108 adds INT metadata "M3" to packet 124, which metadata is stripped from packet 124 and optionally summarized before being sent to network management collector 110. If packet 124 was copied from a network flow, it need not be forwarded out an INT edge port to target devices or networks.

Figure 2:
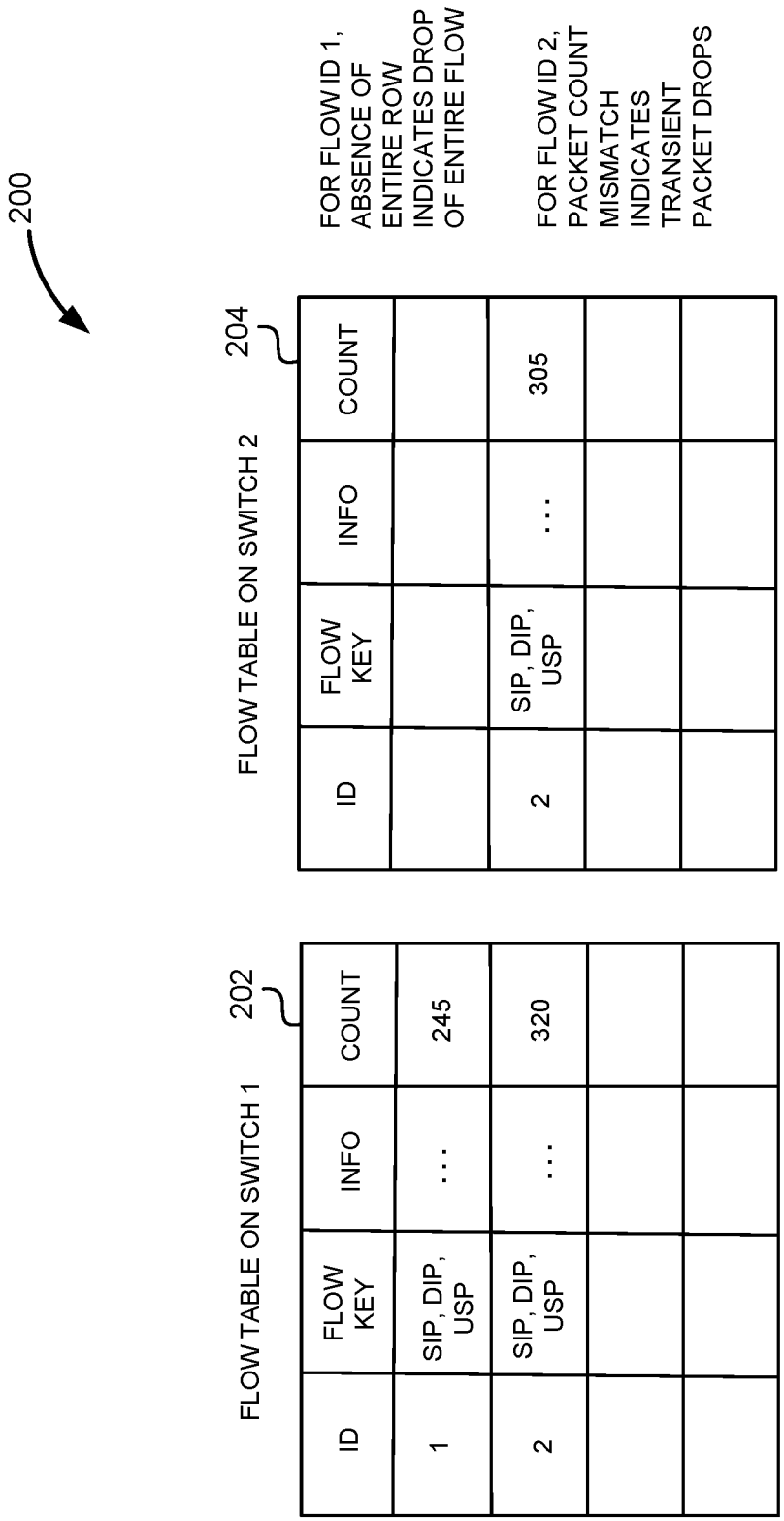
FIG. 2 illustrates example flow tables for use in connection with characterizing one or more data flows within an INT domain according to one or more embodiments.

FIG. 2 illustrates a set of example flow tables 200 for use in connection with characterizing one or more data flows within an INT domain according to one or more embodiments. Flow table 202 illustrates a set of packet flows, each of which may be identified by a packet flow identifier, which column may be a serial number, designated "ID" in the illustrative tables. The tables also contain a column designated flow key which may include five tuples for each flow, e.g., source IP address, destination IP address, protocol, source port and destination port associated with the packet flows, and finally a packet count, designated "COUNT" in the flow tables depicted in FIG. 2.

As illustrated, flow table 202 contains two packet flows, a first flow having a packet flow identifier of "1" and a second packet flow having a packet flow identifier of "2." In flow table 202, for the packet flow having an identifier of "1," there is a corresponding packet count of 245. As to the packet flow having an identifier of "2," within flow table 202, the packet count is 320. As depicted, flow table 202 is associated with a first switch, being designated as "switch 1." With respect to flow table 204, which as depicted is associated with a second switch, being designated as "switch 2." Differences between statistics associated with packet flows in flow tables of different switches provides information regarding the packet flows as they are forwarded between various switches within an INT domain. With respect to the packet flow having an identifier of "1," as shown in FIG. 2, this packet flow is not present in flow table 204. The absence of an entire row indicates that the entire flow was dropped between the first and second switches. With respect to the packet flow having an identifier of "2," the entire flow was not dropped as it is present in flow table 204, which is associated with the second switch, however the packet count of 305 is less than the packet count of 320 which is in flow table 202, which is associated with the first switch. This lower number of packets indicates transient packet drops within the flow from the first switch to the second switch.

Example Methods

Figure 3A:
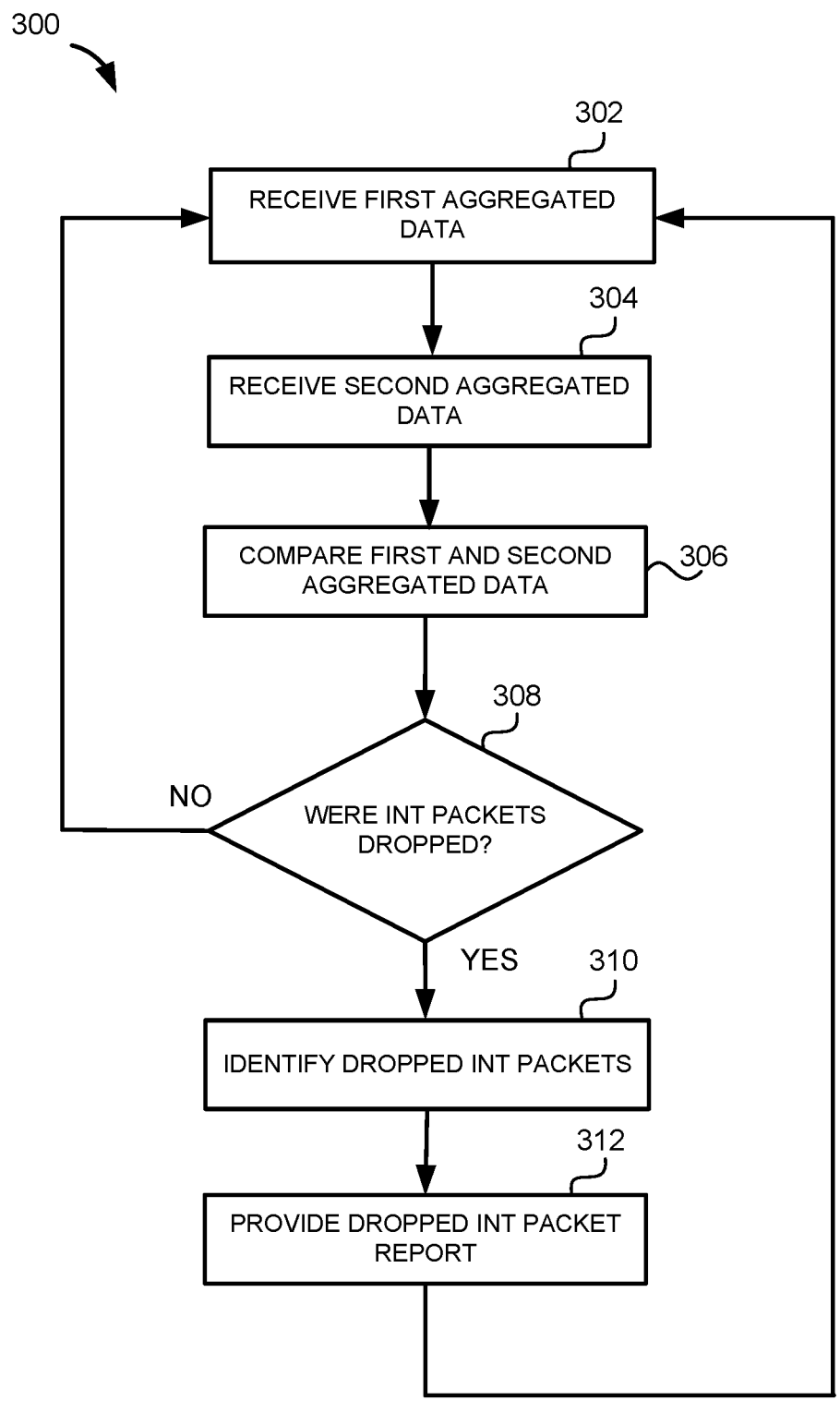
FIGS. 3A-3B illustrate example methods for characterizing one or more data flows within an in-band telemetry (INT) domain according to one or more embodiments.

FIG. 3A illustrates an example method 300 for characterizing one or more data flows within an in-band telemetry (INT) domain according to one or more embodiments. This is directed to a network management collector that receives flow data from various devices such as switch 104, switch 106, and/or switch 108 shown in FIG. 1 above. First, at step 302, a network management collector may periodically receive, from a first aggregating network device, first aggregated statistical data regarding a flow of INT packets. The flow of INT packets flow from an initiator network device to a terminator network device across an INT domain such as the INT domain shown in FIG. 2 above. Typically, the flow of INT packets flows from the initiator network device via one or more transit network devices to the terminator network device. Such an initiator network device may be similar to switch 104, the transit network devices analogous to switch 106, and the terminator network device analogous to switch 108 (all of FIG. 2 above).

Next, at step 304, the network management collector periodically receives aggregated statistical data regarding the flow of INT packets from a second aggregating network device. In some embodiments, this may involve computing statistical information regarding aspects of a particular packet flow received at the second aggregating network device. The second aggregating network device may also look into INT metadata associated with certain sampled and copied INT packets that the second aggregating network device may receive from upstream network devices that forward INT packets associated with the packet flow. This INT metadata may provide information regarding the network flow and may enable the second aggregating network device to infer that certain packets in the packet flow may have been dropped, e.g., by comparing a packet count associated with the packet flow with an actual number of packets received. In some embodiments, when the second aggregating network device detects that packets have been dropped, the second aggregating network device may provide an interim explicit dropped packet report to one or more network monitoring systems, such as network management collector 110 of FIG. 1. In some embodiments, all switches in an INT domain periodically report contents of their flow tables to one or more network monitoring devices.

At step 306, the one or more network monitoring devices compare aggregated data from the first and second aggregating network devices. This may be accomplished by comparing certain portions of the respective flow tables, and for example may involve identifying flows that are present in flow tables of upstream devices and absent in flow tables of downstream devices. In such a scenario, the loss (or drop) of an entire packet flow may be detected. Additionally, or in the alternative, one or both of the first and second aggregating network devices identified dropped packets explicitly. This may be accomplished where a network device drops a packet for some reason associated with an outbound port. In this case, the network device may have specific information regarding why the packet was dropped, e.g., congestion or queue overflow, etc. Accordingly, in response to comparing the first aggregated statistical data and the second aggregated statistical data, one or more identified dropped INT packets may be implicitly or explicitly identified.

Next, at test 308, it is determined whether packets were dropped. As noted, such dropped packets may be associated with a loss of an entire packet flow or include only portions of a packet flow. If no dropped packets are detected, execution proceeds back to step 302. If at test 308, dropped packets are detected, execution proceeds to step 310. At step 310, the packets that have been dropped and optionally reasons for the packets having been dropped are identified. Finally, at step 312, based on the one or more implicitly or explicitly identified dropped INT packets in the flow of INT packets, a dropped INT packet notification is provided to a network management collector for example to notify a network administrator device. As used herein, "implicitly" means that the network management collector is analyzing the received information from the individual devices to identify/determine any dropped packets, whereas "explicitly" means that the network devices determine/identify such dropped packets and provide a clear notification to the collector regarding such dropped packets.

In some embodiments, the network management collector may receive from the second aggregating network device, one or more dropped INT packet reports regarding details for dropping, by the second aggregating network device, one or more explicitly dropped INT packets. In some embodiments, the dropped INT packet reports comprise a reason for the second aggregating network device dropping the one or more explicitly dropped INT packets. In some other embodiments, the first aggregated statistical data comprises INT packet metadata. In some such embodiments, the INT packet metadata comprises one or more of network data flow paths, per hop latency, and congestion information. In some embodiments, the one or more network dataflow paths comprises one or more of equal cost multipath (ECMP) identifiers or link aggregation group (LAG) identifiers. Moreover, upon implicitly identifying the one or more dropped INT packets in the flow of INT packets, one or more upstream network devices may be queried for upstream INT packet metadata regarding the one or more dropped INT packets.

Figure 3B:
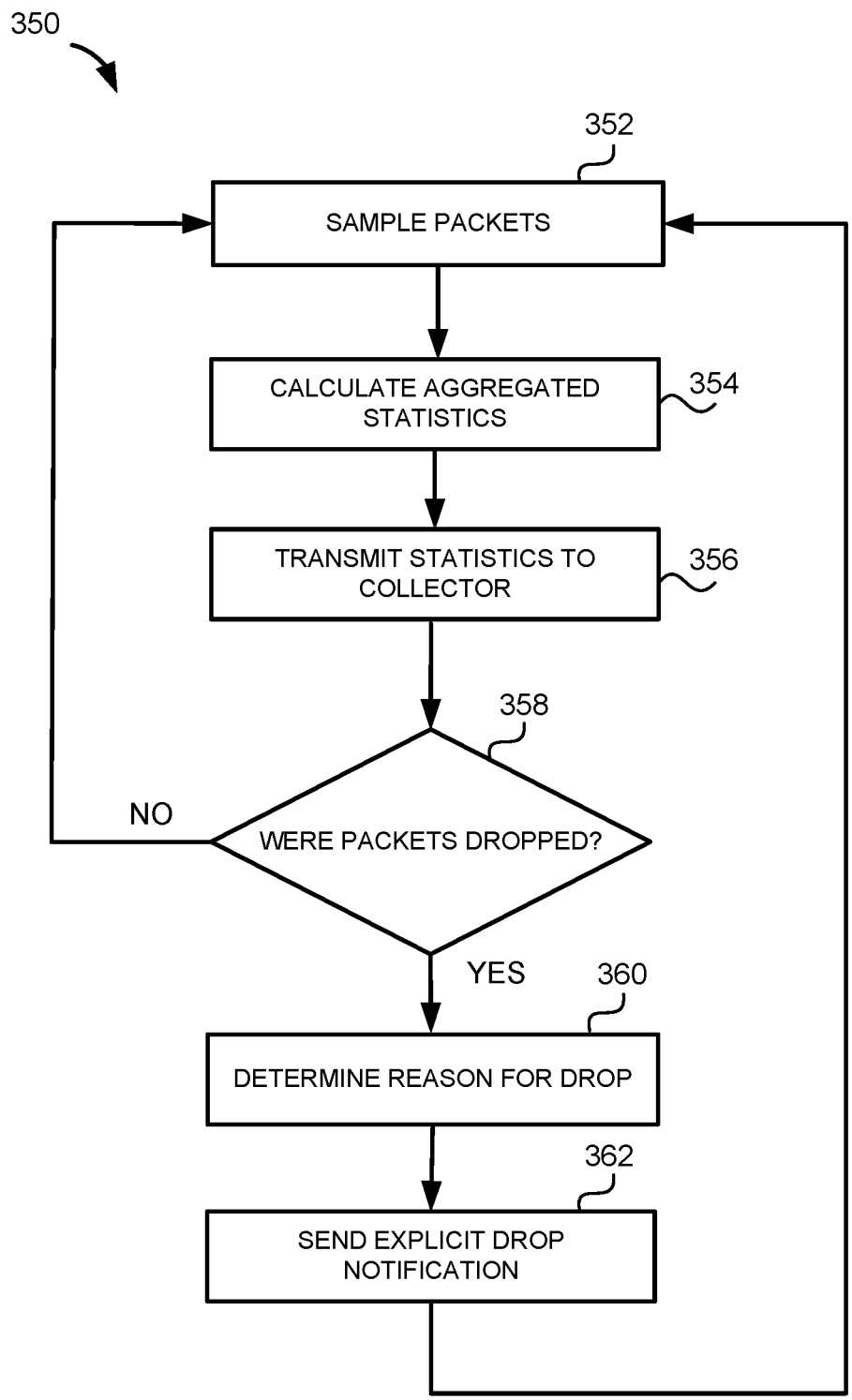

FIG. 3B illustrates another example method 350 for characterizing one or more data flows within an in-band telemetry (INT) domain according to one or more embodiments. Method 350 may facilitate detection of dropped packets and provide an associated explicit dropped packet notification. Method 350 is directed to a device that is part of the in-band flow such as switch 106. First, at step 352, packets in a packet flow may be sampled by any number of network devices in an INT domain. Next, at step 354, statistics associated with the packet flow may be calculated. In some embodiments, such statistics are calculated by the network devices in the INT domain and stored in each such network device in a flow table. Next, at step 356 the calculated statistics may be transmitted by each network device to a network management collector. In some such embodiments, portions of flow tables may be periodically sent to a network management device, such as the network management collector.

Next, at test 358, the network device determines whether one or more packets have been dropped. If it is determined that no packets have been dropped, execution continues to step 352. Such a detection of dropped packets may be carried out in a number of ways. First, a network device may detect dropped incoming packets that may be associated with data corruption on an upstream neighbor. Such data corruption may have a multitude of reasons such as electromagnetic or physical interference with a physical medium associated with the connection. Congestion or other logical corruption on an input port may also result in dropped packets. Additionally, the network device may detect dropped packets that it could not send to one or more of its downstream neighbors. This could be caused by congestion, for example, buffer overflows or other problems with a downstream connection. When such a packet drop occurs, the network device will have information regarding why the packet drop occurred. If it is determined that one or more packets have been dropped, execution proceeds to step 360. At step 360, where possible, such a reason is determined for the packet drop. In some cases, where an incoming dropped packet is identified, an upstream neighbor may be interrogated by the network device to determine whether the upstream device has information regarding why the packet drop occurred. Hardware associated with the network device may indicate that there was a dropped packet on an input port, but for example due to an input signal being corrupted, hardware of the network device would not receive detailed information regarding the dropped packet. This would be one such reason that the network device would interrogate an upstream neighbor. Finally, at step 362, an explicit packet drop notification is provided to one or more network management collectors.

Example Network Device

Figure 4:
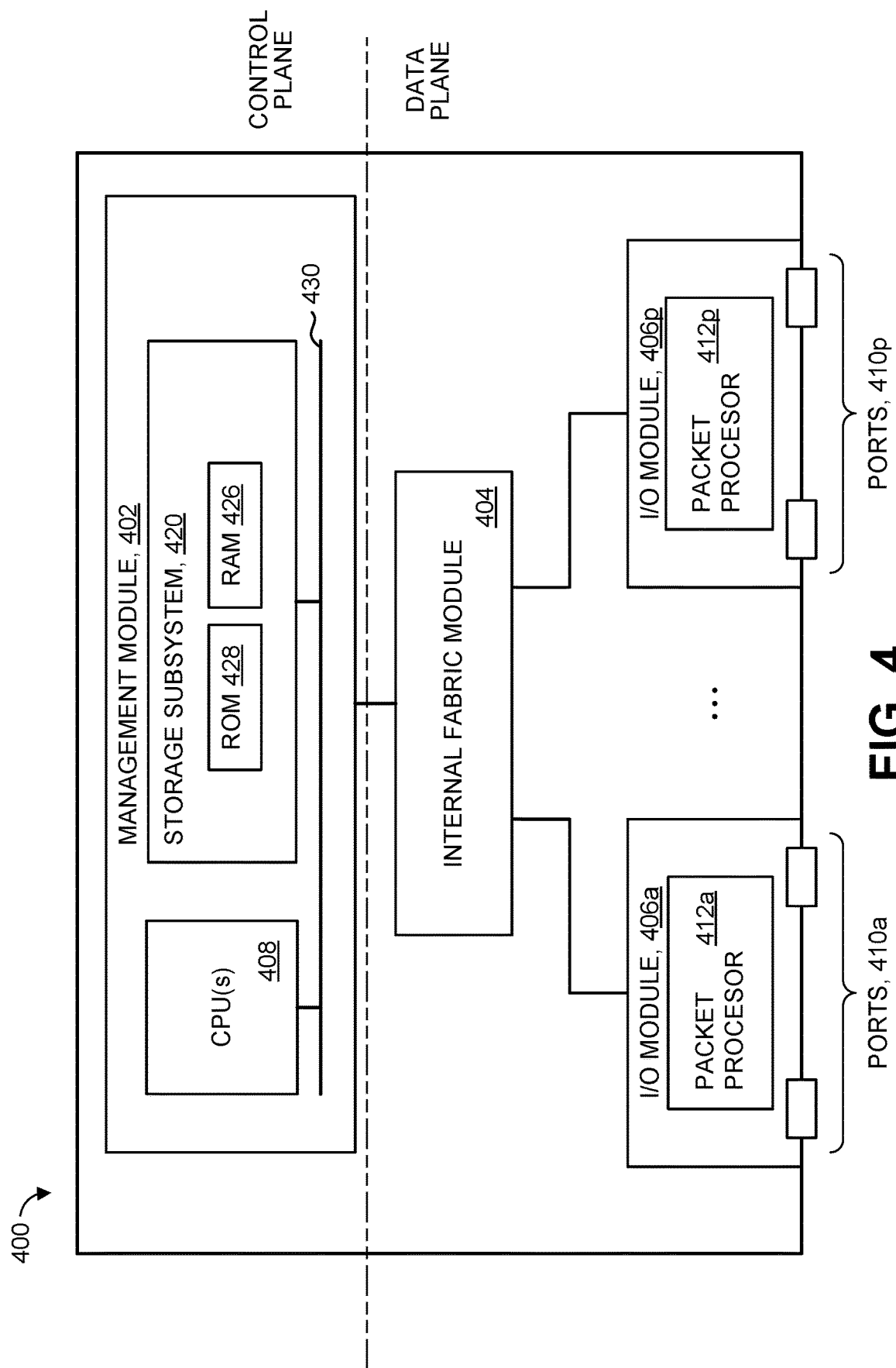
FIG. 4 illustrates an example of a network device that can be adapted in accordance with one or more embodiments.

FIG. 4 illustrates an example network device 400 that can be adapted in accordance with some embodiments of the present disclosure. Network device 400 may be a switch or a router, for example. As shown, network device 400 may include management module 402, internal fabric module 404, and a number of I/O modules 406a to 406p. Management module 402 may be disposed of in a control plane (also referred to as control layer) of the network device 400 and can include one or more management CPUs 408 for managing and controlling operation of network device 400 in accordance with the present disclosure. Management CPU(s) 408 may be general-purpose processors, such as an Intel®/AMD® x86-64 or ARM® processor, that operates under the control of software stored in a memory, such as storage subsystem 420, which may include read-only memory (ROM) 428 and/or random-access memory (RAM) 426 and be connected via bus 430. The control plane refers to all the functions and processes that determine which path to use, such as routing protocols, spanning tree, and the like. Such processors may perform methods based on instructions executed by the processors.

Internal fabric module 404 and I/O modules 406a to 406p collectively represent a data plane of network device 400 (also referred to as data layer, forwarding plane, etc.). Internal fabric module 404 is configured to interconnect the various other modules of network device 400. Each I/O module 406a to 406p includes one or more input/output ports 410a to 410p that are used by network device 400 to send and receive network packets. Each I/O module 406a to 406p can also include a packet processor 412a to 412p. Each packet processor 412a to 412p may comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Example Host Device

FIG. 5 illustrates an exemplary hardware platform according to one or more embodiments. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple buses or components that may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 are connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage. Network 516 is in turn connected to public Internet 526, which connects many networks globally. In some embodiments, computer 500 can itself be directly connected to public Internet 526 which may be connected to server 522 and additional server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the disclosure has been described with reference to the embodiments illustrated in the attached drawing figures, it is noted that equivalents may be employed, and substitutions made herein without departing from the scope of the disclosure as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed disclosure in sufficient detail to enable those skilled in the art to practice the disclosure. Other embodiments can be utilized, and changes can be made without departing from the claimed scope of the disclosure. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the disclosure, what is claimed as new and desired to be protected by Letters Patent includes the following:

1. A computer-implemented method for characterizing one or more data flows within an in-band telemetry (INT) domain, the method comprising:
    periodically receiving, from a first aggregating network device, by a network management collector, first aggregated statistical data regarding a flow of INT packets, the flow of INT packets flowing from an initiator network device to a terminator network device of the INT domain,
    wherein the flow of INT packets flows from the initiator network device via one or more transit network devices to the terminator network device;
    periodically receiving, from a second aggregating network device in the one or more transit network devices, by the network management collector, second aggregated statistical data regarding the flow of INT packets;
    in response to comparing the first aggregated statistical data and the second aggregated statistical data, implicitly identifying one or more dropped INT packets in the flow of INT packets; and
    based on the one or more dropped INT packets in the flow of INT packets, providing a dropped INT packet notification to a network administrator device that is not in the INT domain, wherein the dropped INT packet notification identifies the one or more dropped packets.

2. The method of claim 1, wherein the first aggregated statistical data and the second aggregated statistical data comprise INT packet metadata.

3. The method of claim 2, wherein the INT packet metadata comprises one or more of network data flow paths, per hop latency, and congestion information.

4. The method of claim 3, wherein the network data flow paths comprise one or more of equal cost multipath (ECMP) identifiers or link aggregation group (LAG) identifiers.

5. The method of claim 1, wherein the second aggregated statistical data includes a dropped INT packet report that further includes an explicit notification of one or more dropped INT packets.

6. The method of claim 5, wherein the dropped INT packet reports comprises a reason for the second aggregating network device dropping the one or more explicitly dropped INT packets.

7. The method of claim 1, further comprising:
    upon implicitly identifying the one or more dropped INT packets in the flow of INT packets, querying one or more upstream network devices for upstream INT packet metadata regarding the one or more dropped INT packets.

8. One or more non-transitory computer-readable media storing computer-executable instructions that, when executed by a processor, perform a method of characterizing one or more data flows within an in-band telemetry (INT) domain, the method comprising:
    periodically receiving, from a first aggregating network device, by a network management collector, first aggregated statistical data regarding a flow of INT packets, the flow of INT packets flowing from an initiator network device to a terminator network device,
    wherein the flow of INT packets flows from the initiator network device via one or more transit network devices to the terminator network device;
    periodically receiving, from a second aggregating network device in the one or more transit network devices, by the network management collector, second aggregated statistical data regarding the flow of INT packets;
    in response to comparing the first aggregated statistical data and the second aggregated statistical data, implicitly identifying one or more dropped INT packets in the flow of INT packets; and
    based on the one or more dropped INT packets in the flow of INT packets, providing a dropped INT packet notification to a network administrator device that is not in the INT domain, wherein the dropped INT packet notification identifies the one or more dropped packets.

9. The one or more non-transitory computer-readable media of claim 8, wherein the method further comprises further comprising receiving from the second aggregating network device, by the network management collector, one or more dropped INT packet reports regarding details for dropping, by the second aggregating network device, one or more explicitly dropped INT packets.

10. The one or more non-transitory computer-readable media of claim 9, wherein the dropped INT packet reports comprises a reason for the second aggregating network device dropping the one or more explicitly dropped INT packets.

11. The one or more non-transitory computer-readable media of claim 10, wherein the first aggregated statistical data comprises INT packet metadata.

12. The one or more non-transitory computer-readable media of claim 11, wherein the INT packet metadata comprises one or more of network data flow paths, per hop latency, and congestion information.

13. The one or more non-transitory computer-readable media of claim 12, wherein the network data flow paths comprise one or more of equal cost multipath (ECMP) identifiers or link aggregation group (LAG) identifiers.

14. The one or more non-transitory computer-readable media of claim 8, wherein the method further comprises:
upon implicitly identifying the one or more dropped INT packets in the flow of INT packets, querying one or more upstream network devices for upstream INT packet metadata regarding the one or more dropped INT packets.

15. A system for characterizing one or more data flows within an in-band telemetry (INT) domain, the system comprising:
a processor; and
one or more non-transitory computer-readable media storing computer-executable instructions that, when executed by the processor, perform a method comprising:
periodically receiving, from a first aggregating network device, by a network management collector, first aggregated statistical data regarding a flow of INT packets, the flow of INT packets flowing from an initiator network device to a terminator network device,
wherein the flow of INT packets flows from the initiator network device via one or more transit network devices to the terminator network device;
periodically receiving, from a second aggregating network device in the one or more transit network devices, by the network management collector, second aggregated statistical data regarding the flow of INT packets;
in response to comparing the first aggregated statistical data and the second aggregated statistical data, implicitly identifying one or more dropped INT packets in the flow of INT packets; and
based on the one or more dropped INT packets in the flow of INT packets, providing a dropped INT packet notification to a network administrator device that is not in the INT domain, wherein the dropped INT packet notification identifies the one or more dropped INT packets.

16. The system of claim 15, wherein the method further comprises further comprising receiving from the second aggregating network device, by the network management collector, one or more dropped INT packet reports regarding details for dropping, by the second aggregating network device, one or more explicitly dropped INT packets.

17. The system of claim 16, wherein the dropped INT packet reports comprises a reason for the second aggregating network device dropping the one or more explicitly dropped INT packets.

18. The system of claim 15, wherein the first aggregated statistical data comprises INT packet metadata.

19. The system of claim 18, wherein the INT packet metadata comprises one or more of network data flow paths, per hop latency, and congestion information.

20. The system of claim 19, wherein the network data flow paths comprise one or more of equal cost multipath (ECMP) identifiers or link aggregation group (LAG) identifiers.

* * * * *